United States Patent
Kovent

(10) Patent No.: US 10,319,494 B2
(45) Date of Patent: Jun. 11, 2019

(54) MULTI-FUNCTIONAL BUSBAR WITH INTERSTITIAL PASSAGES

(71) Applicant: ALTe Technologies, Inc., Auburn Hills, MI (US)

(72) Inventor: Idan David Kovent, Huntington Woods, MI (US)

(73) Assignee: EMATRIX ENERGY SYSTEMS, INC.

( * ) Notice: Subject to any disclaimer, the term of this patent is extended or adjusted under 35 U.S.C. 154(b) by 225 days.

(21) Appl. No.: 15/016,342

(22) Filed: Feb. 5, 2016

(65) Prior Publication Data

US 2017/0229208 A1    Aug. 10, 2017

(51) Int. Cl.
| | |
|---|---|
| *H01B 5/02* | (2006.01) |
| *H01M 2/34* | (2006.01) |
| *H01M 2/20* | (2006.01) |
| *H01H 85/02* | (2006.01) |
| *H01H 85/055* | (2006.01) |

(52) U.S. Cl.
CPC ........... *H01B 5/02* (2013.01); *H01H 85/0241* (2013.01); *H01H 85/055* (2013.01); *H01M 2/202* (2013.01); *H01M 2/348* (2013.01)

(58) Field of Classification Search
CPC .. H01M 2/1077; H01M 2/202; H01M 10/425; H01M 10/482
See application file for complete search history.

(56) References Cited

U.S. PATENT DOCUMENTS

| | | | | |
|---|---|---|---|---|
| 2008/0131765 A1* | 6/2008 | Imanaga | ............... | H01M 2/204 429/160 |
| 2008/0286636 A1* | 11/2008 | Naito | .................... | H01M 2/105 429/98 |
| 2009/0297892 A1* | 12/2009 | Ijaz | ........................ | H01M 2/105 429/7 |
| 2012/0013340 A1* | 1/2012 | Yuasa | .................... | H01M 2/206 324/430 |
| 2013/0196204 A1* | 8/2013 | Song | ..................... | H01M 2/204 429/99 |
| 2015/0079445 A1* | 3/2015 | Jeong | .................... | H01M 2/105 429/121 |
| 2015/0214586 A1* | 7/2015 | Yeow | .................. | H01M 10/625 429/120 |
| 2015/0255774 A1* | 9/2015 | Menzies | ............... | H01M 2/206 429/121 |
| 2016/0190663 A1* | 6/2016 | Bahrami | ........... | H01M 10/6553 429/72 |

\* cited by examiner

*Primary Examiner* — Imran Akram
(74) *Attorney, Agent, or Firm* — Tyler B. Droste; Gutwein Law

(57) ABSTRACT

A busbar configured to facilitate electrical connection of multiple battery cells in a manner that further supports functions such as mounting, cell level fusing, layer level fusing, and cooling channels.

13 Claims, 6 Drawing Sheets

MULTI-FUNCTIONAL BUSBAR WITH INTERSTITIAL PASSAGES

FIELD OF THE INVENTION

This invention relates generally to a multi-functional busbar for use in battery packaging.

BACKGROUND

It is known in the electronics industry to use busbars to make electrical connections between various components. In the context of batteries, busbars may be used to join multiple battery cells in a desired series or parallel configuration to create the desired electrical properties of a battery module or battery pack.

Battery systems may be used to provide power in a wide variety of applications. Examples of transportable applications include hybrid electric vehicles (HEV), plug-in HEVs, and electric vehicles (EV). Examples of stationary applications include backup power for telecommunications systems, uninterruptible power supplies (UPS), and distributed power generation applications.

Busbars provide the electrical connection between cells and between modules. Busbars require a conductive material, originally copper, shaped in a geometry that can connect at least two cell terminals or at least two module terminals. Busbars are usually welded or fastened to the cell terminals. Welding requires a robust automated process with numerous quality control measures in place. Fastening is a very time-consuming process when a pack has thousands of cells, typically with at least two fasteners used for each cell.

Examples of the types of batteries that are used include nickel metal hydride (NiMH) batteries, lead-acid batteries, lithium batteries, lithium-ion batteries, and other types of batteries in a cylindrical form factor. A battery module includes a plurality of cells that are connected in series, parallel, or a combination thereof. The modules themselves may be connected in series, parallel, or a combination thereof in forming a complete battery pack.

One common challenge with designing busbars is the avoidance of an electrical short. An electrical short is the application of a cell or module voltage on a feature with very low resistance. This results in very high current, leading to rapid heating of the circuit. If the battery cell comprises electrolyte or chemicals that expand during heating, shorting of some cells may cause venting of gases or rupture of the cell casing. Igniting of the gases or the heated internal elements of a shorted cell may cause a thermal event. Often, a chain reaction ensues, wherein a violent reaction of one cell to a short may propagate to other nearby cells, thus causing a catastrophic consequences.

Even in typical operation, cells produce heat as they are being charged and discharged. If the heat is not dissipated in time, the cell may reach temperatures that can cause similar effects as described for a shorted cell.

Welded and fastened busbars can easily accommodate a fusible link. Some designs in the art rely on solder fuses from the busbar to each cell, which is time-consuming and expensive. Moreover, traditional pressure-based busbar cannot use soldered fuses.

Further, busbars are typically not part of the cooling design, although they are on the shortest path for the heat created in the cells to be removed.

The present invention is directed to overcome one or more of the problems as set forth above.

DETAILED DESCRIPTION

Figure 1:
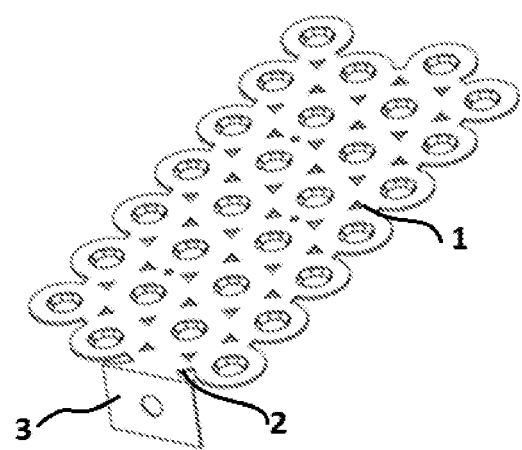
FIG. 1 is a perspective view of a busbar according to the disclosure.

The present disclosure is directed to a busbar design that supports multiple functions beyond solely electrical connection that traditional busbars supply. The busbar integrates several functions that are traditionally separate from the busbar into the single busbar design. Specifically, the additional functions are mounting, cell level fusing, layer level fusing, and cooling channels. Also, the material may be coated with suitable coatings that are formulated to protect the busbar from oxidation.

As described further herein, the busbar utilizes mechanical pressure to accomplish the above listed features by incorporating unique members into the busbar design itself, relying on precise spring force to ensure connectivity and conductivity, and further comprises a fusible link. Moreover, the invention comprises cooling media flow passages integrated into the design of the busbar to facilitate cooling of the busbars, which act as heat sinks to the individual cells, and promote heat flow parallel to the length of the cells. Establishing a thermal gradient along the length of the cell allows more streamlined flow than heat flow perpendicular to the length of the cell.

In one aspect, the busbar provides electrical contact between multiple cells electrically connected in parallel and physically oriented in one geometrical layer, wherein the cells are oriented substantially side-by-side and creating interstitial voids therebetween with each cell terminal, whether positive or negative, in contact with a busbar. In one embodiment, another busbar is employed to connect the other terminals of the cells, thereby creating an electrical configuration where the cells are connected in parallel.

In another aspect, the busbar may further provide electrical contact between two layers of parallel-connected cells. One layer is physically below the busbar and has all its positive terminals connected to a bottom surface of the busbar. A second layer of parallel-connected cells is physically connected to the top surface of the busbar and has all negative terminals connected thereto, thus electrically connecting both layers in a series connections.

It is within the scope of the current disclosure that multiple layers can be added on top of one other to reach the necessary module voltage utilizing a busbar described herein to electrically connect each layer of parallel-connected cells.

The electrical connection of the busbar to each cell is achieved via fusible links. The fusible link may be a tab that extends down from the busbar and has a smaller cross-sectional area than the rest of the busbar. This allows the link to melt and open the circuit if a cell is externally shorted. The link is designed to open before the short can create enough heat in the cell to affect other cells in the module.

The fusible link tab provides spring force against the cell terminal, thus providing constant contact with the terminal during any movement that may be encountered during operation. The fusible link tab cross-section and length are defined by the fusing current, fusing time, and busbar material. Other geometrical features of the tab, such as bends in the material or the use of multiple tabs of smaller cross-section, are defined by the required spring force. The spring force on one terminal assures the contact of both terminals with the busbars above and below. This obviates the need for welding or fastening of the cells to the busbars.

The busbar has holes located between the portions thereof that are in contact with the terminals. These holes create a passage for air flow moving in parallel with the cell's length. The air flow can be used for cooling or heating of the cells, as often desired in battery modules.

One end of the busbar leads to a single contact point that can be connected to loads or to other modules external to the specific module containing the busbar. The path to the contact point is shaped as a bottle-neck to form a specific cross-section over a specific length and create a second fusible link. This second fusible link protects the layer of cells connected in parallel from an external short. If the layer is externally shorted, the second fusible link will melt and open the circuit. This is designed to happen before the heat created in the shorted layer can affect other parts of the battery module.

INDUSTRIAL APPLICATION

Figure 5:
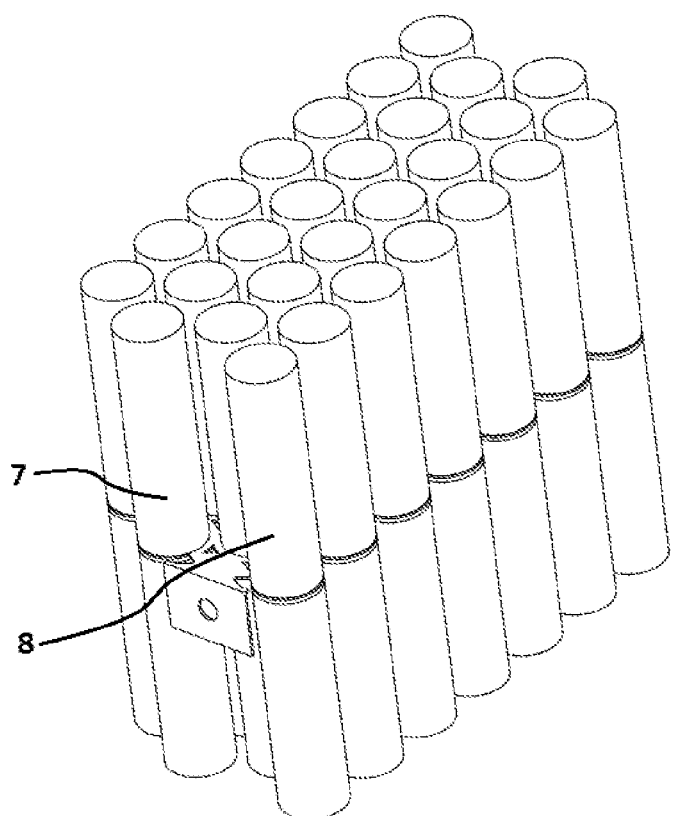
FIG. 5 is a perspective view of a busbar according to the disclosure in-between two layers of battery cells.

In practice, the busbar [11] provides electrical contact between multiple cells electrically connected in parallel in one geometrical layer with the cells standing side-by-side with the same terminal, positive or negative, of all cells in contact with the busbar, for example cell #1 [7] and cell #2 [8] in FIG. 5. The figure illustrates an example of a 28 parallel-connected cells in every layer. The module electrical capacity is decided by the cell capacity multiplied by the number of cells in parallel. A second busbar connecting all terminals at the distal end of the cells will complete electrically-parallel connection.

The smallest cross-section over the largest distance must be large enough for the resistive power losses under load to be minimal. Resistance of such section is calculated using equation:

$$R = \rho * l / A \quad [1]$$

Where:
R=resistance
ρ=resistivity
l=length
A=cross-section area

Resistivity is a material dependent property, making the choice of material important in determining the optimal busbar features. The material may be, for example, copper, a copper-based alloy, or copper with a surface treatment or coating, such as, for example, tin-plated copper. In an example where the material is selected to be tin-plated copper, the resistivity is approximately $1.68 \times 10^{-8}$ Ohm-meter resistivity. The cross-sectional area may be between about 2 $mm^2$ and about 10 $mm^2$, such as between about 3 $mm^2$ and about 9 $mm^2$, such as between about 4 $mm^2$ and about 8 $mm^2$. The acceptable limit of this resistance is a function of the internal cell resistance, as well as the ability of a thermal sub-system within the battery module to remove heat.

The power loss ($P_{loss}$) in the smallest cross-section is calculated using I, the mean current flowing through that section, according to the equation:

$$P_{loss} = I^2 * R \quad [2]$$

$P_{loss}$ is compared to the overall resistive power losses of the layer and expected to be less than a given fraction. For example, less than about 10% of the overall resistive power losses of the pack will be due to losses in the busbar's main section, such as less than about 5%, such as less than about 2.5%, such as less than about 1%, such as less than about 0.50%, such as less than about 0.20%, such as less than about 0.10%, or such as less than about 0.05% of the overall resistive power losses of the pack will be due to losses in the busbar's main section.

Figure 2:
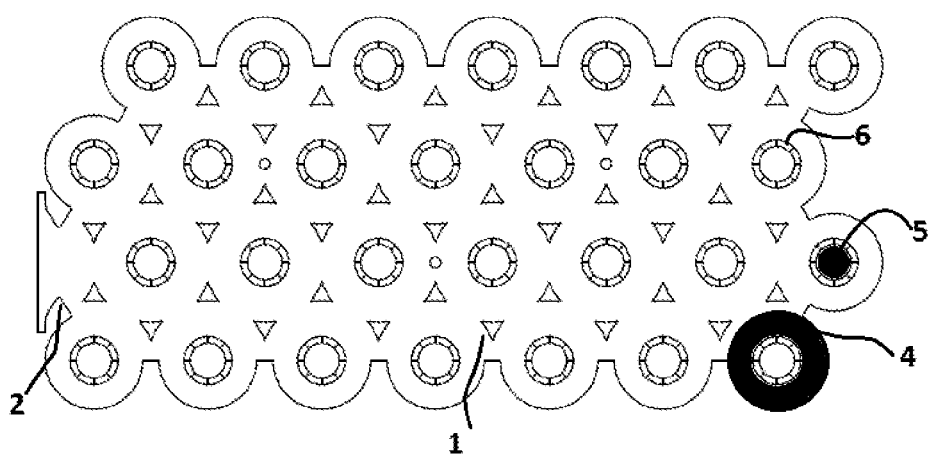
FIG. 2 is a top-down perspective view of a busbar according to the disclosure.
Figure 3:
FIG. 3 is a generally side perspective view of a busbar according to the disclosure.
Figure 4:
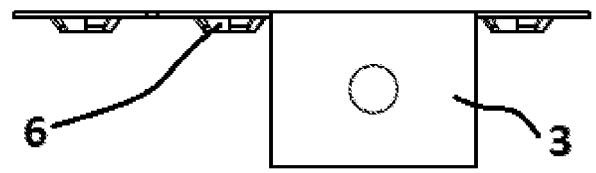
FIG. 4 is a generally side perspective view of from the edge comprising a contact point of a busbar according to the disclosure.
Figure 6:
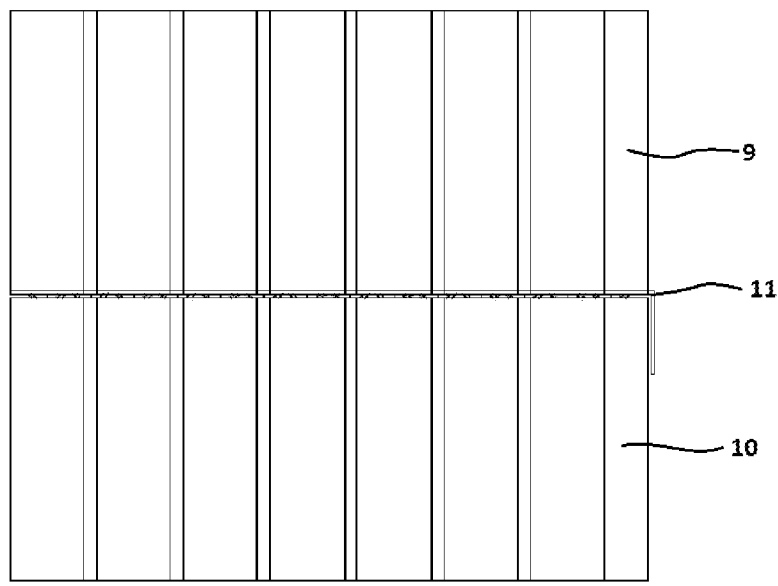
FIG. 6 is generally side perspective view of a busbar according to the disclosure in-between two layers of battery cells.

The busbar [11] provides electrical contact between two layers of parallel-connected cells. FIG. 6 illustrates one layer [10], physically below the busbar [11], having all its positive terminals connected to the bottom of the busbar [11]. Second layer [9], physically above the busbar, has all negative terminals connected to the top of the busbar [11], thus connecting both layers in an electrically-series connection. FIG. 2 illustrates the area of the busbar used to contact a cell in the layer above [4] and the area of the busbar used to contact a cell in the layer below [5]. Multiple layers can be added on top of each other to reach the necessary module voltage since the module voltage=cell voltage*number of layers.

The connection of the busbar [11] to each and every cell in the layer below it [10] is done via fusible links [6]. Each link is a tab that extends down from the busbar and has a smaller cross-section than the rest of the busbar. This makes the tab the highest resistance point of the busbar, such that the link melts and opens the circuit if a cell is externally shorted and the associated current exceeds the fusible link's tolerance.

The short current is calculated using the equation for Ohm's law, I=V/R, where V is the cell's minimum voltage and R is the circuit resistance including the cells' internal resistance and the short path outside the cell. Most of the path's resistance is negligible compared to the cell internal resistance. Tab resistance is calculated using equation [1] above. Power loss over the tab is also the resistive heat created in the tab and is calculated using equation [2] above.

Based on the material used, a change of temperature from ambient to melting point, ΔT, is determined. The equation below is used to calculate t, the time for the tab to melt and open the circuit:

$$Q = m * C_p * \Delta T \quad [4]$$

where:
Q is the heat created at the tab and is equal to $P_{loss}*t$;
m is the mass of the tab equal to $\rho'*v$ ($\rho'$=density of the material and v=volume, which is defined as the cross-section area*length of the tab; and
$C_p$ is the material's specific heat coefficient at constant pressure.

The cross section, length, and material can be modified as needed to yield a desired melt-open time. The tab power loss must not be larger than a set fraction of the cell's resistive losses. For example, in one application, less than about 0.20% of the overall resistive power losses of the pack will be due to losses in the busbar's main section, such as less than about 0.10% of the overall resistive power losses of the pack will be due to losses in the busbar's main section, such as less than about 0.05% of the overall resistive power losses of the pack will be due to losses in the busbar's main section. The cross-sectional area may be between about 2 mm$^2$ and about 10 mm$^2$, such as between about 3 mm$^2$ and about 9 mm$^2$, such as between about 4 mm$^2$ and about 8 mm$^2$. In one embodiment the cross sectional area is about 0.8 mm$^2$.

The length may be between about 0.5 mm and about 2.5 mm, such as between about 1 mm and about 2 mm, such as between about 1.3 mm and about 1.5 mm. In one embodiment the length is about 1.4 mm.

The time to melt the tab is preferably less than about 180 seconds, such as less than about 150 seconds, such as less than about 120 seconds, such as less than about 110 seconds, such as about 105 seconds.

The time to open the fusible link is set such that the tab breaks to open the local circuit before the short can create enough heat in the cell to affect other cells, thus allowing the continuous work of the rest of the layer. In one example, only less than about 10 Wh, such as less than about 7.5 Wh, such as about 5.5 Wh, is needed to open the fusible link. In some embodiments, such a sufficient energy level may be achieved at about 1400K.

The fusible link tab [6] provides spring force against the cell terminal below it, thus maintaining constant contact with the terminal during any motion that may be encountered during operation. The tab cross-section and length are defined by the fusing current, fusing time, and busbar material as described above. Other geometrical features of the tab, such as bends and twists in the material or the use of multiple tabs of smaller cross-section, are defined by the required spring force. In one embodiment, for example, the tab [6] may be designed as a simple coil spring or Belleville washer as shown in the drawings. The spring force on one terminal assures contact of both terminals with the busbars above and below, negating any need for welding or fastening of the cells to the busbars.

The spring coefficient of the tab, k, can be calculated using Hooke's law:

$$k = F/x$$

Where:
F=force applied on the tab by the mass of the cells above it and any external force applied on it to compress or deflect
x=required deflection of the tab to provide full contact with the terminal without coming in direct contact with the busbar above.

For a Belleville washer spring, the main geometrical features used to calculate k are H (unloaded spring height), t (tab thickness), D (outer spring diameter), and d (inner spring diameter). The material modulus of elasticity, E, is also necessary to determine k.

The busbar has holes [1] located between the portions thereof that are in contact with the terminals. These holes create a passage for air flow moving in parallel with the cell's length. The air flow can be used for cooling or heating of the cells, as often desired in battery modules.

One end of the busbar leads to a single contact point [3] that can be connected to loads or to other modules external to the specific module containing the busbar. The path to the contact point [3] is shaped as a bottle-neck to form a specific cross-section over a specific length and create a second fusible link [2]. This second fusible link protects the layer of cells connected in parallel from an external short. If the layer is externally shorted, the second fusible link will melt and open the circuit. This is designed to happen before the heat created in the shorted layer can affect other parts of the battery module.

The busbar accepts minimal losses through the fusible links because the fusible links have higher resistance than the remainder of the busbar. In one aspect, the busbar of the invention utilizes the same material for the busbar and fusible links. In another embodiment, a second material is utilized for the fusible link sections. In this embodiment, the material could have a lower melting point and/or lower specific heat than the main busbar material.

In another aspect, the busbar may further comprise support ribs or corrugated design to alter the structural rigidity of the busbar.

The distance between the fusible links and the cooling flow passages is capable of being modified to be located in an orientation to accommodate various cell sizes and formats.

What is claimed is:

1. A busbar battery system comprising:
   a plurality of battery cells, wherein each battery cell has a positive terminal and a negative terminal, wherein said battery cells are physically oriented geometrically in at least two layers of parallel-connected battery cells, wherein said geometrical orientation is configured to form interstitial passages between said plurality of battery cells; and
   at least one busbar having a top surface and bottom surface, comprising:
      a unitary body portion having a first cross-sectional material area, a plurality of airway openings, a plurality of fusible link tabs extending down from the body portion, wherein said fusible link tabs each correspond to at least one battery cell, wherein the plurality of fusible link tabs have a second cross-sectional material area, and at least one contact point configured to contact a battery cell, wherein the first cross-sectional material area is larger than the second cross-sectional material area;
      wherein said fusible link tab is configured to exert a spring force against the battery cell to maintain constant contact between at least one battery cell and the fusible link tab; and
   wherein said busbar is configured to provide electrical contact between the layers of parallel-connected battery cells,
   wherein a first layer of parallel-connected battery cells is located above a second layer of parallel-connected battery cells,
   wherein said airway openings are configured to facilitate airflow through the interstitial passages between the battery cells.

2. The busbar battery system of claim 1, wherein each interstitial passage between said battery cells corresponds to the airway openings on the body portion of the busbar.

3. The busbar battery system of claim 1, wherein said busbar is located between said first layer of parallel-connected battery cells and second layer parallel-connected battery cells, wherein said top surface connects to the negative terminals of the battery cells of said first layer and said bottom surface connects to the positive terminals of the second layer.

4. The busbar battery system of claim 1, wherein said airway openings are further configured to establish a thermal gradient along a length of the battery cells.

5. The busbar battery system of claim 1, wherein the fusible link is a tab extending from said busbar, wherein the body portion is comprised of a first material having a first melting point and each fusible link tab is comprised of a second material having second melting point, wherein the second melting point is lower than the first melting point.

6. The busbar battery system of claim 5, wherein said busbar further comprises a contact point link, wherein said contact point link has a third cross-sectional material area, wherein said third cross-sectional material area is less than said first cross-sectional material area.

7. The busbar battery system of claim 1, wherein said busbar airway openings are aligned with said interstitial passages formed between the first layer of parallel-connected battery cells and the second layer of parallel-connected battery cells.

8. The busbar battery system of claim 1, wherein the fusible link tabs have a current tolerance, wherein the second cross-sectional area of the fusible link tab is configured to be the highest resistance point of the busbar, wherein the second cross-sectional area of the fusible link tab is further configured to melt under an external short event when a current exceeds the current tolerance of the fusible link tabs.

9. The busbar battery system of claim 1, wherein said contact point can be configured to connect to an external load or external module.

10. The busbar battery system of claim 1, wherein said airway openings are further configured to establish a thermal gradient along a length of the battery cells.

11. A busbar battery system comprising:
- a plurality of battery cells, wherein each battery cell has a positive terminal and a negative terminal, wherein said battery cells are physically oriented geometrically in at least two layers of parallel-connected battery cells, wherein said geometrical orientation is configured to form interstitial passages between said plurality of battery cells; and
- at least one busbar having a top surface and bottom surface, comprising: a unitary body portion having a first resistance value, plurality of openings, a plurality of fusible link tabs extending down from the body portion, wherein said fusible link tabs each correspond to at least one battery cell, wherein the plurality of fusible link tabs have a second resistance value, and at least one contact point configured to contact a battery cell, wherein the first resistance value is smaller than the second resistance value;
- wherein said busbar is configured to provide electrical contact between the layers of parallel-connected battery cells,
- wherein a first layer of parallel-connected battery cells is located above a second layer of parallel-connected battery cells,
- wherein said openings are configured to facilitate flow of a cooling means through the interstitial passages between the battery cells.

12. The busbar battery system of claim 11, wherein said busbar further comprises a contact point and a body fusible link configured to protect a layer of cells connected in parallel from an external short.

13. The busbar battery system of claim 12, wherein the body fusible link is configured to form a bottle-neck having a higher resistance value than the body portion.

* * * * *